(12) United States Patent
Iso et al.

(10) Patent No.: US 8,007,181 B2
(45) Date of Patent: Aug. 30, 2011

(54) ROLLING BEARING

(75) Inventors: Kenichi Iso, Fujiwasa (JP); Yujiro Toda, Fujisawa (JP); Yoichi Imamura, Fujisawa (JP)

(73) Assignee: NSK Ltd., Tokyo (JP)

( * ) Notice: Subject to any disclaimer, the term of this patent is extended or adjusted under 35 U.S.C. 154(b) by 82 days.

(21) Appl. No.: 11/660,520

(22) PCT Filed: Jul. 19, 2005

(86) PCT No.: PCT/JP2005/013247
§ 371 (c)(1),
(2), (4) Date: Feb. 20, 2007

(87) PCT Pub. No.: WO2006/018945
PCT Pub. Date: Feb. 23, 2006

(65) Prior Publication Data
US 2007/0206892 A1    Sep. 6, 2007

(30) Foreign Application Priority Data

Aug. 19, 2004  (JP) ................................. 2004-239139

(51) Int. Cl.
*F16C 19/00*  (2006.01)
*C10M 169/04*  (2006.01)
(52) U.S. Cl. ........................................ 384/462; 508/110
(58) Field of Classification Search .................. None
See application file for complete search history.

(56) References Cited

U.S. PATENT DOCUMENTS

| | | | |
|---|---|---|---|
| 5,840,666 A | 11/1998 | Yokouchi et al. | |
| 5,910,470 A | 6/1999 | Minami et al. | |
| 6,255,261 B1 * | 7/2001 | Liesen et al. | 508/469 |
| 6,450,691 B1 * | 9/2002 | Okuma et al. | 384/477 |
| 2002/0183213 A1 * | 12/2002 | Komiya et al. | 508/485 |
| 2003/0069147 A1 * | 4/2003 | Kawamura et al. | 508/555 |
| 2006/0073989 A1 | 4/2006 | Fujita et al. | |

FOREIGN PATENT DOCUMENTS

| | | |
|---|---|---|
| CN | 1292391 A | 4/2001 |
| DE | 102 02 817 A1 | 8/2002 |
| JP | 02-080493 A | 3/1990 |
| JP | 03-231993 A | 10/1991 |
| JP | 05-140576 A | 6/1993 |
| JP | 05-149343 A | 6/1993 |
| JP | 07-011276 A | 1/1995 |
| JP | 8-113793 A | 5/1996 |
| JP | 11-022740 A | 1/1999 |
| JP | 2001-122925 A | 8/2001 |
| JP | 2004-210971 A | 7/2004 |
| KR | 1996-0014310 A | 5/1996 |
| WO | 2004/061058 | 7/2004 |

OTHER PUBLICATIONS

Chinese Office Action dated Mar. 28, 2008.
Korean Office Action dated Mar. 31, 2008.
Extended European Search Report, dated Dec. 21, 2010 issued in Application No. 05766316.3.
G.W. Stachowiak, "Engineering Tribology", 1990, XP040426108, pp. 1-801.

* cited by examiner

*Primary Examiner* — Thomas R Hannon
*Assistant Examiner* — Phillip A Johnson
(74) *Attorney, Agent, or Firm* — Sughrue Mion, PLLC

(57) ABSTRACT

A grease composition having an apparent viscosity at −30° C. of 5 to 200 Pa·s is sealed in a rolling bearing which retains a plurality of rolling elements between an inner ring and an outer ring in such a way that the rolling elements can freely roll. Thereby, there is provided a rolling bearing which has a satisfactory lubricating performance and generates less abnormal noise even under a low temperature of around −40° C.

3 Claims, 2 Drawing Sheets

ROLLING BEARING

TECHNICAL FIELD

The present invention relates to a rolling bearing having a grease composition sealed therein. More particularly, the invention relates to a rolling bearing which can be used in automotive electrical parts and engine accessories, such as alternators or compressor pulleys, idler pulleys, and electromagnetic clutches for automotive air conditioners and has excellent low-temperature properties.

BACKGROUND ART

With popularization of front-engine front-wheel-drive vehicles for the purpose of achieving smaller and lighter weight vehicles and also increasing demands for larger riding spaces, automobiles are inevitably undergoing reduction in engine room space and thus requiring even smaller and lighter weight solutions for the electrical parts and engine accessories, such as alternators or idler pulleys, electromagnetic clutches for automotive air conditioners, and water pumps. In addition, it is increasingly desired for these individual parts to exhibit higher performance and greater output.

However, reduction in output with smaller size is unavoidable, and for example, increasing speed of alternators or electromagnetic clutches for automotive air conditioners compensates the reduction in output, which results in commensurate increase in idler pulley speed as well. Furthermore, since demands for improved silence have accelerated air-tightness of engine rooms and elevation of temperature in the engine room, such parts are required to have greater resistance against a high temperature of 180 to 200° C. Moreover, since automobiles are used in very cold land such as Alaska or Siberia, it is also necessary that the rolling bearings to be incorporated into the above individual parts should generate few trouble in rotation or less abnormal noise on start-up even under a cold condition of −30 to −40° C.

From such viewpoints, recently, grease compositions excellent in thermal stability, high-speed resistance, load resistance, and low-temperature properties have been developed and employed. For example, a diphenyl ether oil excellent in thermal stability is used as a base oil and a diurea compound excellent in heat resistance is used as a thickening agent, and on the other hand, it becomes the mainstream to use a base oil having a high viscosity in order to ensure a certain oil-film thickness in consideration of high load.

However, when the viscosity of a base oil increases, insufficient fluidity between a retainer of rolling bearings and rolling elements may occur on start-up at low temperature and a vibration noise may be sometimes generated at the retainer and outer ring. Moreover, since apparent viscosity of the grease composition also increases, grease is not fluidized between the rolling elements and the inner and outer rings, and thus lubrication conditions become insufficient, a vibration noise may be sometimes generated. In addition, since these vibration noises resonate with an attached site and are amplified into offensive abnormal noises, it becomes important to take measures to meet the situation especially at very cold land and the like.

In order to reduce the generation of such abnormal noises, there have been devised measures of sealing a grease composition wherein a mixed oil obtained by mixing an alkyldiphenyl ether oil and a poly(α-olefin) oil in a specific ratio is used as a base oil and a diurea compound is used as a thickening agent (see, Patent Document 1), of applying a lubricating oil such as a poly(α-olefin) oil onto a friction surface inside a bearing in an amount of 1.0 mg/cm$^2$ or more (see, Patent Document 2), of applying an antirust lubricating oil containing an ester oil, a synthetic hydrocarbon oil, an ether oil, or the like as a main ingredient, which has a kinematic viscosity at 40° C. of 50 mm$^2$/s or less (see, Patent Document 3), and the like measures.

Patent Document 1: Japanese Patent Unexamined Publication JP-A-5-140576
Patent Document 2: Japanese Patent Unexamined Publication JP-A-5-149343
Patent Document 3: Japanese Patent Unexamined Publication JP-A-11-22740

DISCLOSURE OF THE INVENTION

Problems that the Invention is to Solve

However, with regard to the grease composition of Patent Document 1, when the viscosity of the mixed oil is high or the kind and amount of the thickening agent is inadequate, apparent viscosity of the grease increases and an effect of reducing abnormal noises becomes insufficient. Moreover, the methods of applying a lubricating oil as in Patent Documents 2 and 3 are effective at an early stage of running, but the effect of reducing abnormal noises decreases because the grease composition and the lubricating oil are mixed when running is continued.

Thus, an object of the invention is to provide a rolling bearing which is satisfactory in lubricating performance and exhibits less generation of abnormal noises even under a low temperature of around −40° C.

Means for Solving the Problems

As a result of the studies for solving the above problems, the present inventors have confirmed that correlation is sometimes not necessarily observed between kinematic viscosity of a base oil and fluidity of a grease composition, and abnormal noises are generated at low temperature even with a grease composition using a base oil having a low viscosity, although it is hitherto the mainstream to define viscosity of the grease composition in order to reduce the generation of abnormal. noises under low temperature. This is because, since a grease composition comprises three ingredients of a base oil, a thickening agent, and additives, rheological properties of the grease composition come under the influence of not only the kinematic viscosity of the lubricating oil but also the thickening agent, and the additives. In addition, they have found that fluidity of a grease composition depends on a Theological property (apparent viscosity) of the grease composition and a grease composition having a specific apparent viscosity does not induce the generation of abnormal noises even under very low temperature.

Namely, in order to achieve the above object, the invention provides a rolling bearing, comprising a plurality of rolling elements rotatably held between an inner ring and an outer ring, wherein a grease, of which composition has an apparent viscosity of 5 to 200 Pa·s at −30° C., is sealed.

Advantages of the Invention

The rolling bearing of the invention is satisfactory in lubricating performance and generates less abnormal noise even under a low temperature of around −40° C., and hence it is suitable for automotive electrical parts and engine accessories.

DESCRIPTION OF REFERENCE NUMERALS AND SIGNS

Figure 1:
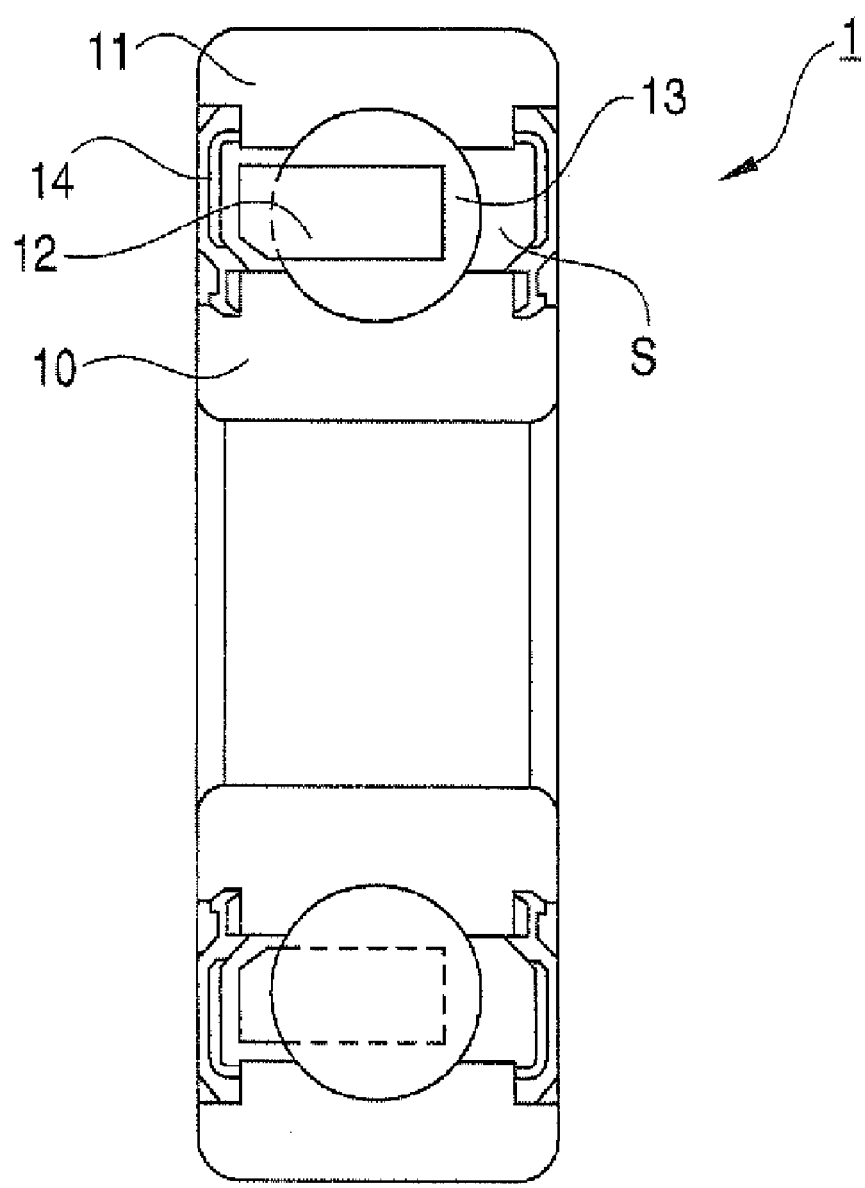
FIG. 1 is a cross-sectional view showing an embodiment of a rolling bearing according to the present invention.

1 ball bearing
10 inner ring
11 outer ring
12 retainer
13 ball
14 seal

BEST MODE FOR CARRYING OUT THE INVENTION

The following will explain the present invention in detail.

In the invention, the kind and structure of the rolling bearing is not limited and, for example, various rolling bearings hitherto used in automotive electrical parts and engine accessories, such as alternators or compressor pulleys, idler pulleys, and electromagnetic clutches for automotive air conditioners are targeted, and particularly, a remarkable effect tends to appear in bearings having an inner diameter of 8 to 60 mm. As a specific example, a ball bearing 1 shown in FIG. 1 can be exemplified. The rolling bearing 1 retains a plurality of balls 13, which serve as rolling elements, between an inner ring 10 and an outer ring 11 via a retainer 12 and further, a bearing space S is filled with a grease composition to be described later and is sealed with a seal 14.

With regard to the grease composition to be sealed, the base oil, the thickening agent, the additives, and further mixing amounts thereof are not particularly limited as far as the apparent viscosity at −30° C. is from 5 to 200 Pa·s as a grease composition, but preferred embodiments thereof are shown in the following. In this connection, the apparent viscosity is more preferably from 5 to 100 Pa·s (−30° C.). More preferred is from 5 to 80 Pa·s (−30° C.)

In order to avoid the generation of abnormal noises at start-up at low temperature owing to deficiency in low-temperature fluidity or occurrence of seizing owing to difficulty in formation of an oil film at high temperature, a base oil has a kinematic viscosity at 40° C. of preferably 10 to 400 mm$^2$/s, more preferably 20 to 250 mm$^2$/s, particularly preferably 25 to 150 mm$^2$/s. Moreover, a base oil having a pour point of −30° C. or lower is desirable.

As the kind of the base oil, mineral oil-based lubricating oils, synthetic oil-based lubricating oils, and natural oil-based lubricating oils may be mentioned.

As the mineral oil-based lubricating oils, there can be used those obtained by refining mineral oils through appropriate combinations of vacuum distillation, oil deasphalting, solvent extraction, Hydrogenolysis, solvent dewaxing, sulfuric acid cleansing, white clay refining, hydro-treating, and the like.

As the synthetic oil-based lubricating oils, there can be mentioned hydrocarbon-based oils, aromatic base oils, ester-based oils, ether-based oils, and the like.

As the hydrocarbon-based oils, there can be mentioned normal paraffin, iso-paraffin, polybutene, polyisobutylene, 1-decene oligomer, and poly-α-olefins such as 1-decene and ethylene cooligomer, or hydrogenated products thereof.

As the aromatic oils, there can be mentioned alkylbenzenes, such as monoalkylbenzenes and dialkylbenzenes, or alkylnaphthalenes, such as monoalkylnaphthalenes, dialkylnaphthalenes, and polyalkylnaphthalenes.

As the ester-based oils, there can be mentioned diester oils such as dibutyl sebacate, di-2-ethylhexyl sebacate, dioctyl adipate, diisodecyl adipate, ditridecyl adipate, ditridecyl glutarate, and methyl acetylcinnolate; aromatic ester oils such as trioctyl trimellitate, tridecyl trimellitate, and tetraoctyl pyromellitate; polyol ester oils such as trimethylolpropane caprylate, trimethylolpropane pelargonate, pentaerythritol-2-ethylhexanoate, and pentaerythritol pelargonate, and further complex ester oils which are oligoesters of polyhydric alcohols and fatty acid mixtures of dibasic acids and/or monobasic acids.

As ether-based oils, there may be mentioned polyglycols such as polyethylene glycol, polypropylene glycol, polyethylene glycol monoethers, and polypropylene glycol monoethers; phenyl ether oils such as monoalkyltriphenyl ethers, alkyldiphenyl ethers, dialkyldiphenyl ethers, pentaphenyl ether, tetraphenyl ether, monoalkyltetraphenyl ethers, and dialkyltetraphenyl ethers.

As other synthetic lubricating base oils, there may be mentioned tricresyl phosphate, silicone oils, perfluoroalkyl ethers, and the like.

As natural oil-based lubricating oils, there may be mentioned fat and oil-based oils such as beef tallow, lard, soybean oil, rapeseed oil, rice bran oil, coconut oil, palm oil, and palm kernel oil, or hydrogenated products thereof.

Among them, because of a low pour point, synthetic hydrocarbon oils, ester-based oils, ether-based oils, and the like are preferred. These base oils may be used solely or as a mixture and adjusted to the aforementioned preferable kinematic viscosity.

The thickening agent is not particularly limited, as far as the thickening agent has capability of forming a gel structure and retaining a base oil in the gel structure. For example, there can be suitably selected and used metallic soaps such as metallic soaps formed of Li, Na, and the like and composite metallic soaps selected from Li, Na, Ba, Ca, and the like; and non-soaps such as benton, silica gel, urea compounds, urea-urethane compounds, and urethane compounds. In consideration of heat resistance of a grease composition, urea compounds, urea-urethane compounds, urethane compounds, or mixtures thereof are preferable. As the urea compounds, urea-urethane compounds, and urethane compounds, there can be specifically mentioned diurea compounds, triurea compounds, tetraurea compounds, polyurea compounds, urea-urethane compounds, diurethane compounds, and their mixtures. Among them, diurea compounds, urea-urethane compounds, diurethane compounds, and mixtures thereof are more preferred. In consideration of heat resistance and acoustic characteristic, formulation of diurea compounds is further preferred.

In order to impart further excellent performance to the grease composition, known additives may be added thereto, if necessary.

For example, there may be added any one or a suitable combination of:

antioxidants such as amine-based and phenol-based ones;

extreme-pressure additives such as chlorine-based ones, sulfur-based ones, phosphorus-based ones, zinc dithiophosphate, and organic molybdenum;

oiliness such as fatty acids and animal/vegetable oils;

rust retardants such as petroleum sulfonates, dinonyl naphthalenesulfonate, and sorbitan esters;

metal inactivators such as benzotriazole and sodium nitrite;

viscosity index improvers such as polymethacrylates, polyisobutylene, and polystyrene; and the like.

The amount thereof to be added is not particularly limited as far as the desired object of the invention can be achieved, but is usually 10% by weight of less based on the total amount of the grease composition.

The method for producing the above grease composition is also not particularly limited but the grease composition is generally obtained by reacting a thickening agent in a base oil. The additives may be incorporated into the resulting grease composition in a predetermined amount, but it is necessary to sufficiently stirring the grease composition after the additives have been added by use of a kneader or a roll mill, to thereby uniformly disperse them. Heating is effective for the processing.

Figure 2:
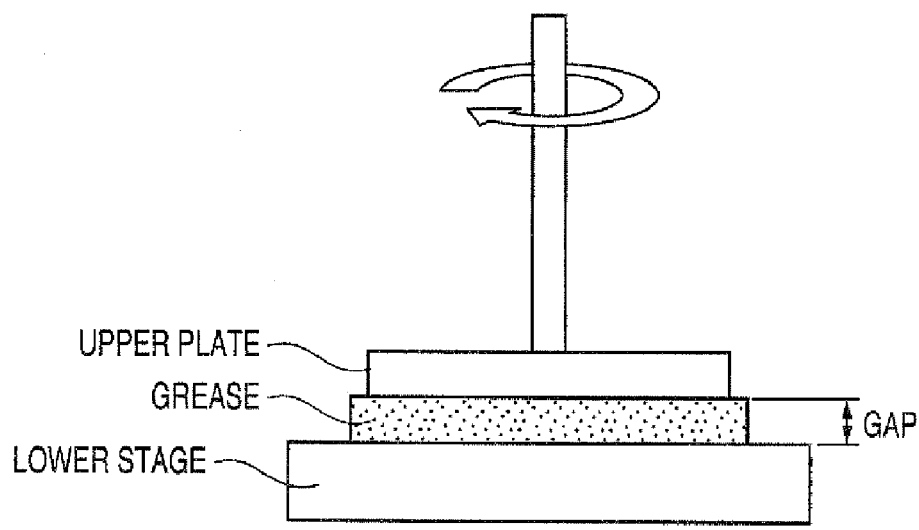
FIG. 2 is a schematic drawing for describing a composition of an apparatus for measuring an apparent viscosity.

"VAR100" manufactured by REOLOGICA INSTRUMENTS. The measuring apparatus has a constitution as schematically shown in FIG. 2, wherein a test grease is held between an lower stage and an upper plate and a predetermined stress is applied by rotating the upper plate toward the arrow direction in the figure. Specifically, a gap was made 1 mm and a stress of 1500 Pa was applied to the upper plate with maintaining the test grease at −30° C. by cooling the lower stage. Apparent viscosity was calculated from a value obtained at the time when resistance became steady after 200 to 500 seconds from the start of the rotation. The results are also shown in Table 1.

Figure 3:
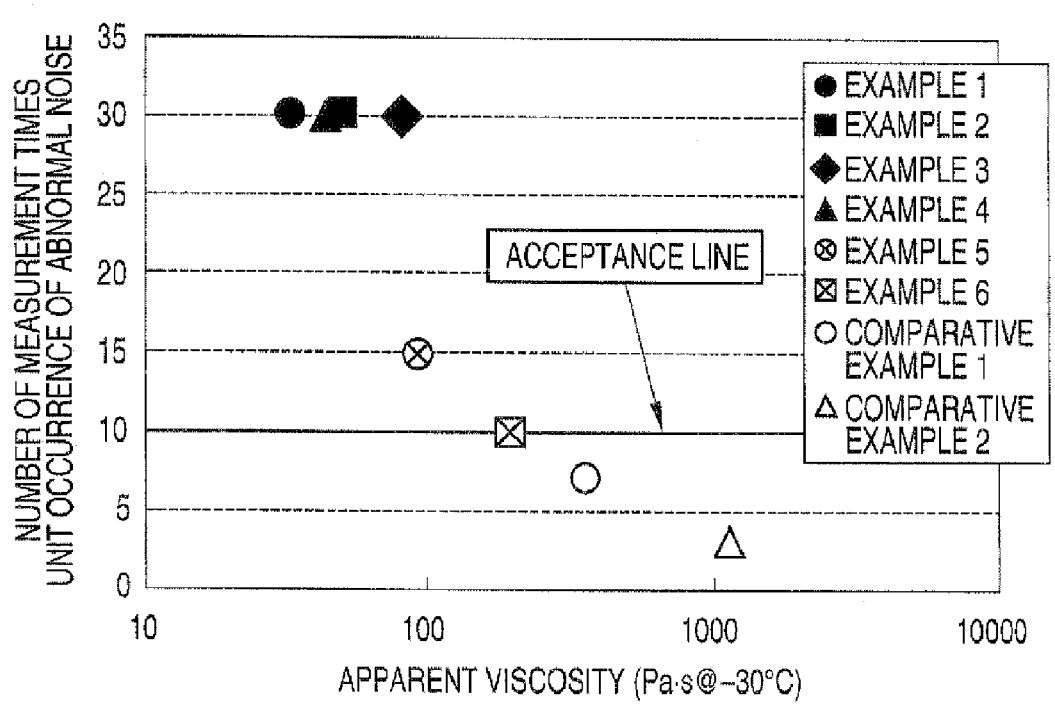
FIG. 3 is a graph showing the relationship between the apparent viscosity of test greases and the number of times until generation of abnormal noises, which is obtained in Example.

Moreover, a single-row deep-groove ball bearing (an inner diameter of 17 mm, an outer diameter of 47 mm, and a width of 14 mm) having 1.5 g of the test grease sealed therein was incorporated into an alternator. After about 2 hours of standing in a low-temperature chamber at −30° C., the bearing was rotated for 40 seconds under conditions of an inner-ring rotation speed of 6000 $min^{-1}$, a radial load of 1320 N, and an axial load of 490 N and generation of abnormal noises at the rotation was checked. In the case that abnormal noises were not generated, the same measurement was performed after 20 minutes of standing and the operation was repeated until abnormal noises were generated. In this connection, the number of measurement times was 30 times at most and cases where abnormal noises were not generated even at repeated measurement of 10 times or more were judged acceptable. The results are shown in Table 1 and in FIG. 3 in the form of a graph.

[Table 1]

TABLE 1

| | Example 1 | Example 2 | Example 3 | Example 4 | Example 5 | Example 6 | Comparative Example 1 | Comparative Example 2 |
|---|---|---|---|---|---|---|---|---|
| Thickening agent | urea | urea | urea | urea | urea | urea | urea | urea |
| Amount of thickening agent (wt %) | 14 | 19 | 18 | 18 | 20 | 22 | 23 | 24 |
| Base oil | ether oil | ester oil | ether oil + PAO | ether oil | ether oil | ether oil | ether oil | ether oil |
| Kinematic viscosity of base oil ($mm^2$/s@40° C.) | 100 | 33 | 79 | 100 | 100 | 100 | 100 | 100 |
| Worked penetration | 290 | 270 | 285 | 320 | 310 | 305 | 295 | 290 |
| Apparent viscosity (Pa · s@−30° C.) | 31 | 50 | 78 | 43 | 92 | 192 | 350 | 1152 |
| Number of measurement times until generation of abnormal noises | not less than 30 times | not less than 30 times | not less than 30 times | not less than 30 times | 15 times | 10 times | 7 times | 3 times |

EXAMPLES

The following will describe the present invention in more detail with reference to Examples and Comparative Examples, but the invention is not limited thereto.

Examples 1 to 6 and Comparative Examples 1 and 2

Test greases were prepared with the formulations shown in Table 1 and apparent viscosity at −30° C. of each one was measured. The measurement was performed using From Table 1 and FIG. 3, it is realized that excellent low-temperature properties are obtained by sealing a test grease having an apparent viscosity at −30° C. of 200 Pa·s or less, according to the invention. In particular, in Examples 1 to 4 wherein the apparent viscosity at −30° C. was 80 Pa·s or less, less generation of abnormal noise was observed even at repeated measurement of 30 times.

While the invention has been described in detail and with reference to specific embodiments thereof, it will be apparent to one skilled in the art that various changes and modifications can be made therein without departing from the spirit and scope thereof.

The invention claimed is:

1. A rolling bearing, comprising a plurality of rolling elements rotatably held between an inner ring and an outer ring, wherein
a grease, of which composition has an apparent viscosity of 5 to 100 Pa·s at −30° C. after 200 seconds of rotation, is sealed in the bearing, the grease including:
a thickening agent having a urea compound, and
a base oil having kinetic viscosity at 40C° in the range of 10 to 250 mm²/s;
wherein the base oil in the grease is one of ester oil, ether oil and PAO, or a mixture thereof;
wherein the thickening agent in the grease is diurea compound;
wherein an amount of the thickening agent in the grease is in the range of 14 to 22 wt%; and
wherein the rolling bearing is used at temperature under −30 C°.

2. The rolling bearing according to claim 1, wherein the apparent viscosity is 5 to 80 Pa·s.

3. The rolling bearing according to claim 2, wherein the amount of thickening agent in the grease is in the range of 14 to 19 wt%.

* * * * *